(12) United States Patent
Mortarotti

(10) Patent No.: US 8,763,847 B2
(45) Date of Patent: Jul. 1, 2014

(54) UNITS INSULATED WITH FOAMS AND HAVING FLEXIBLE OUTER SKINS

(75) Inventor: Julio Mortarotti, Santiago de Queretaro (MX)

(73) Assignee: Dow Global Technologies LLC, Midland, MI (US)

( * ) Notice: Subject to any disclaimer, the term of this patent is extended or adjusted under 35 U.S.C. 154(b) by 923 days.

(21) Appl. No.: 12/937,615

(22) PCT Filed: Apr. 20, 2009

(86) PCT No.: PCT/US2009/041093
§ 371 (c)(1),
(2), (4) Date: Oct. 13, 2010

(87) PCT Pub. No.: WO2009/131933
PCT Pub. Date: Oct. 29, 2009

(65) Prior Publication Data
US 2011/0031254 A1 Feb. 10, 2011

Related U.S. Application Data

(60) Provisional application No. 61/046,500, filed on Apr. 21, 2008.

(51) Int. Cl.
| | |
|---|---|
| B65D 30/10 | (2006.01) |
| B65D 33/02 | (2006.01) |
| B65D 25/00 | (2006.01) |
| B65D 1/04 | (2006.01) |
| B65D 3/22 | (2006.01) |
| B65D 6/14 | (2006.01) |
| B65D 8/04 | (2006.01) |
| B65D 90/02 | (2006.01) |
| B65D 81/38 | (2006.01) |
| B65D 83/72 | (2006.01) |
| B65D 6/00 | (2006.01) |
| B65D 8/18 | (2006.01) |
| F25D 25/00 | (2006.01) |
| A47J 39/00 | (2006.01) |
| A47J 41/00 | (2006.01) |

(52) U.S. Cl.
USPC ....... 220/592.1; 220/9.1; 220/9.4; 220/62.11; 220/592.09; 220/677; 220/691; 220/692; 220/693

(58) Field of Classification Search
USPC ............. 220/9.1, 592.09, 592.1, 592.25, 9.4, 220/62.11, 62.15, 668, 677, 691, 692, 693
See application file for complete search history.

(56) References Cited

U.S. PATENT DOCUMENTS

| | | | |
|---|---|---|---|
| 3,219,502 A | 11/1965 | Willy | |
| 3,253,731 A * | 5/1966 | Fink et al. ................. | 220/567.3 |

(Continued)

FOREIGN PATENT DOCUMENTS

| | | |
|---|---|---|
| DE | 1712610 U | 12/1955 |
| DE | 1242250 B | 6/1967 |

(Continued)

OTHER PUBLICATIONS

PCT/US2009/041093 International Preliminary Report on Patentability.

(Continued)

*Primary Examiner* — Fenn Mathew
*Assistant Examiner* — Andrew T Kirsch
(74) *Attorney, Agent, or Firm* — Whyte Hirschboeck Dudek S.C.

(57) ABSTRACT

An insulation unit including an inner lining having an inner face and an outer face, in which the inner face is disposed to define a cavity of the insulation unit is provided. An insulating foam is disposed on the outer face of the inner lining, and the insulating foam includes an inner face and an outer face, and the inner face of the insulating foam is adhered to the outer face of the inner lining. An outer lining is disposed on the outer face of the insulating foam. The outer lining includes a non self-supporting flexible skin which is adapted to define at least parts of an outer surface of the insulation unit and is adhered to the outer face of the insulating foam.

19 Claims, 7 Drawing Sheets

(56) References Cited

U.S. PATENT DOCUMENTS

| | | | |
|---|---|---|---|
| 3,269,882 A | | 8/1966 | Willy |
| 3,616,113 A | * | 10/1971 | Sawyer .................. 220/683 |
| 3,753,848 A | * | 8/1973 | Bennett .................. 428/179 |
| 3,951,718 A | * | 4/1976 | Gonzalez .................. 156/79 |
| 5,614,566 A | | 3/1997 | Burkhart et al. |
| 6,164,739 A | | 12/2000 | Schulz et al. |
| 7,174,618 B2 | * | 2/2007 | Lozano et al. .................. 29/460 |
| 2003/0124333 A1 | | 7/2003 | Itaba |
| 2003/0207634 A1 | | 11/2003 | Holeschovsky |
| 2004/0121110 A1 | | 6/2004 | Schmidt et al. |
| 2005/0210912 A1 | * | 9/2005 | Mogil et al. .................. 62/457.7 |

FOREIGN PATENT DOCUMENTS

| | | |
|---|---|---|
| DE | 19811472 A1 | 9/1999 |
| EP | 547515 A2 | 6/1993 |
| EP | 622388 A1 | 11/1994 |

OTHER PUBLICATIONS

PCT/US2009/041093 International Search Report.
PCT/US2009/041093 Written Opinion.

\* cited by examiner

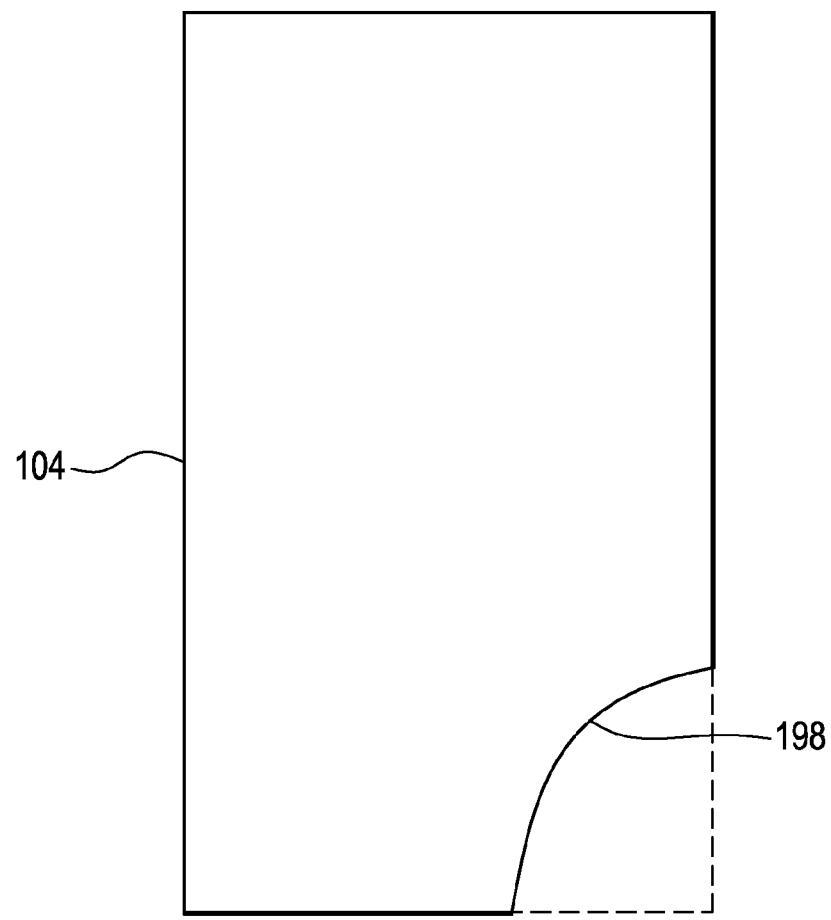

UNITS INSULATED WITH FOAMS AND HAVING FLEXIBLE OUTER SKINS

BACKGROUND

1. Field of the Invention

Embodiments of the present invention generally relate to insulated appliances and to methods of forming these appliances, more specifically refrigerators, freezers, and coolers.

2. Description of the Related Art

Insulation units such as refrigerators and freezers today are typically made from several basic components: an exterior cabinet and door, an inner cabinet or liner, insulation inserted between the two, a cooling system, a refrigerant, and fixtures. The cabinet and door are often made of aluminum or steel sheet metal that is sometimes prepainted. The metal is generally purchased in a coil that is either fed directly into the manufacturing process or cut to size and fed sheet by sheet. The inner cabinet is made of sheet metal, like the outer cabinet, porcelain, or of plastic. The handling and forming of the metal sheets for use in refrigerators requires large and spacious sheet metal handling equipment which is a significant capital cost in the manufacture of cooling units. Furthermore, a limited number of designs are practicable when using sheet metal as the exterior of the units.

Therefore, there is a need for a method of making insulation units, such as refrigerators, freezers, and coolers, in a more economic and flexible manner.

SUMMARY

Embodiments of the present invention generally provides for appliances which include foam insulation made in an economic and flexible manner. In one embodiment of the invention, an insulation unit is provided which includes an inner lining having an inner face and an outer face, in which the inner face is disposed to define a cavity of the insulation unit. An insulating foam is disposed on the outer face of the inner lining, and the insulating foam includes an inner face and an outer face, and the inner face of the insulating foam is adhered to the outer face of the inner lining. An outer lining is disposed on the outer face of the insulating foam. The outer lining includes a non self-supporting flexible skin which is adapted to define at least parts of an outer surface of the insulation unit and is adhered to the outer face of the insulating foam.

In another embodiment, a method for assembling an insulation unit includes providing an inner lining having an inner face and an outer face, wherein the inner face is disposed to define a cavity of the insulating unit, providing an outer lining disposed around the outer face of the of the inner lining in a space apart arrangement, wherein the outer lining includes a non self-supporting flexible skin which is adapted to define at least parts of an outer surface of the insulating unit, and wherein there is a space defining a volume between the outer face of the inner lining and the outer lining, and injecting a foam forming formulation into the volume between the outer face of the inner lining and the outer lining, so that the foam forming formulation is allowed to foam and cure into an insulating foam.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

FIG. 13 illustrates a profile view of a cooling cabinet, according to an embodiment of the invention.

DETAILED DESCRIPTION

Figure 1:
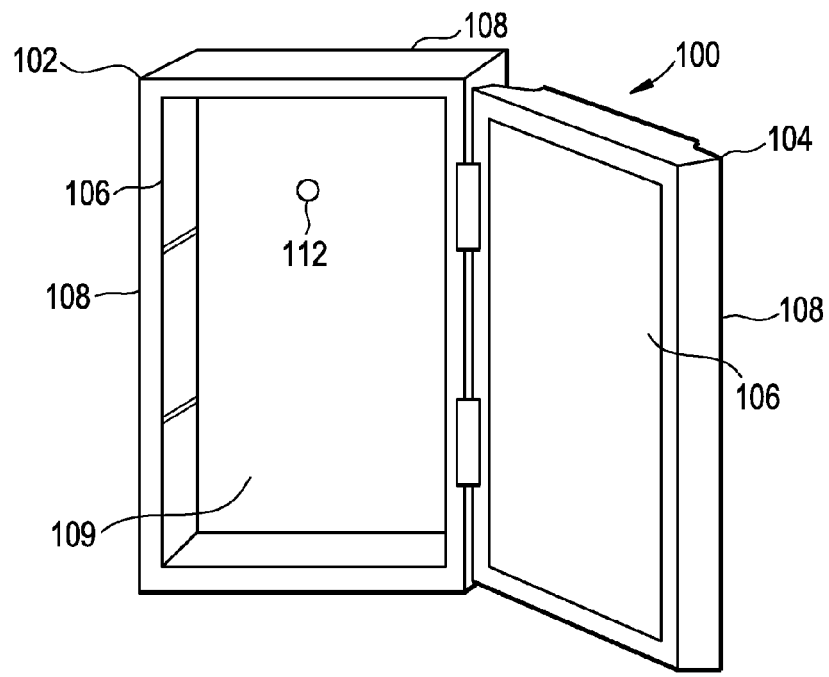
FIG. 1 illustrates an insulation unit, according to an embodiment of the invention.

FIG. 1 depicts an insulation unit 100, according to an embodiment of the invention. The insulation unit 100 may be any suitable unit insulated with a insulating foam. The insulation unit 100 may be a thermal insulating unit such as a refrigerator, freezer, and/or cooler. Additionally, the methods described herein for the production of the insulation unit 100 may also be used to produce sound insulated devices and heating devices, such as dish washers, clothes washers, and water heaters.

The insulation unit 100 includes a cabinet 102 and a door 104. Both the cabinet 102 and the door 104 include an inner liner 106 which has an inner face and an outer face. The inner face of inner liner 106 of the cabinet 102 and the door 104 defines an inner cavity 109 of the insulation unit 100 suitable for storage of articles in need of insulated storage. Surrounding at least partially the inner lining 106 is a non self-supporting flexible skin 108 which defines at least parts of an outer surface of the insulation unit 100. The non self-supporting flexible skin may define at least 10% of the outer surface of the insulation unit 100. In one embodiment, the non-self supporting flexible skin coverage is at least 20%. In another embodiment, the non-self supporting flexible skin coverage is at least 30%. In another embodiment, the non-self supporting flexible skin coverage is at least 40%, In another embodiment, the non-self supporting flexible skin coverage is at least 50%. In another embodiment, the non-self supporting flexible skin coverage is at least 60%. In another embodiment, the non-self supporting flexible skin coverage is at least 70%. In another embodiment, the non-self supporting flexible skin coverage is at least 80%. In another embodiment, the non-self supporting flexible skin coverage is at least 90%. In another embodiment, the non self-supporting flexible skin 108 may completely define the outer surface of the insulation unit 100, thus, essentially replacing typical metal outer liners known in the art.

The non self-supporting flexible skin 108 may be a single layer material or may be made of multiple layers. The non self-supporting flexible skin 108 may be flexible in that, in isolation, the skin may be readily bent or otherwise manipulated, distorted, or shaped using a reasonable amount of force under room temperature or normal operating temperature conditions without tendency to break. The non self-supporting flexible skin 108 may be non self-supporting in that, in isolation, the skin may collapse under its own weight when not shaped or positioned in a fashion in where the skin may hold its weight due to structural or geometric support. Furthermore, upon assembly, the non self-supporting flexible skin 108 may not collapse as the skin is an assembled part of the insulating unit 100. By way of example, while a thin sheet of steel may be flexible and bend, when placed against a wall at a proper angle, it will remain leaning against the wall. In contrast, a similar thickness layer of the non self-supporting flexible skin 108 would collapse when attempting to lean against a wall.

Figure 2:
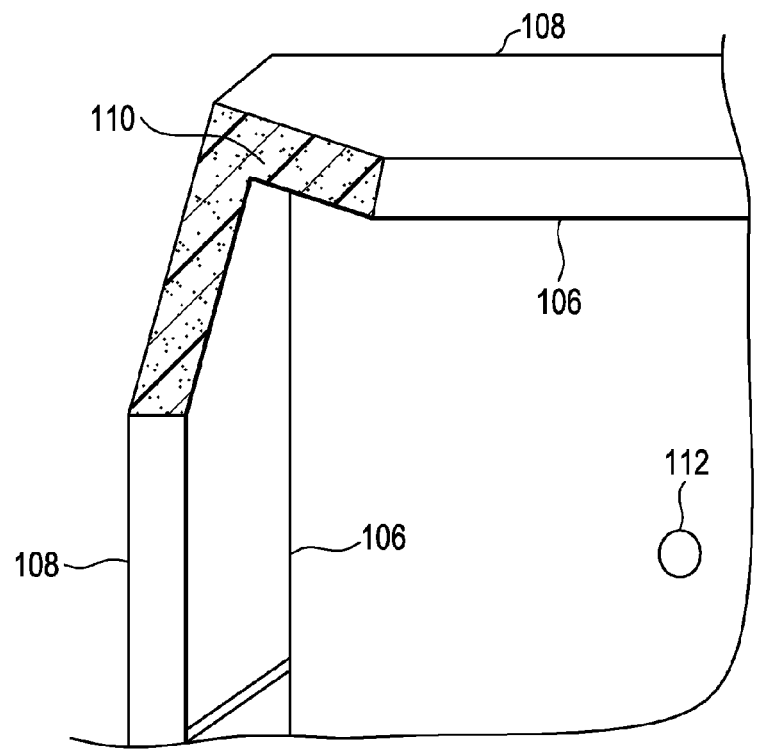
FIG. 2 illustrates a cross-section of a corner of the insulation unit of FIG. 1, according to an embodiment of the invention.

FIG. 2 depicts a section of the insulation unit 100 with a section of the upper left corner cut out to show a portion of a insulating foam 110 which has an inner face and an outer face. The insulating foam 110 occupies a volume between the outer face of inner liner 106 and the flexible skin 108, such that the inner face of the insulating foam 110 adheres to the outer face of the inner lining 106, and the outer face of the insulating foam 110 adheres to the non self-supporting flexible skin 108. One or more access ports 112 may be placed in the cabinet 102, through which electrical hardware and cooling conduits may enter the insulation unit 100.

Figure 3:
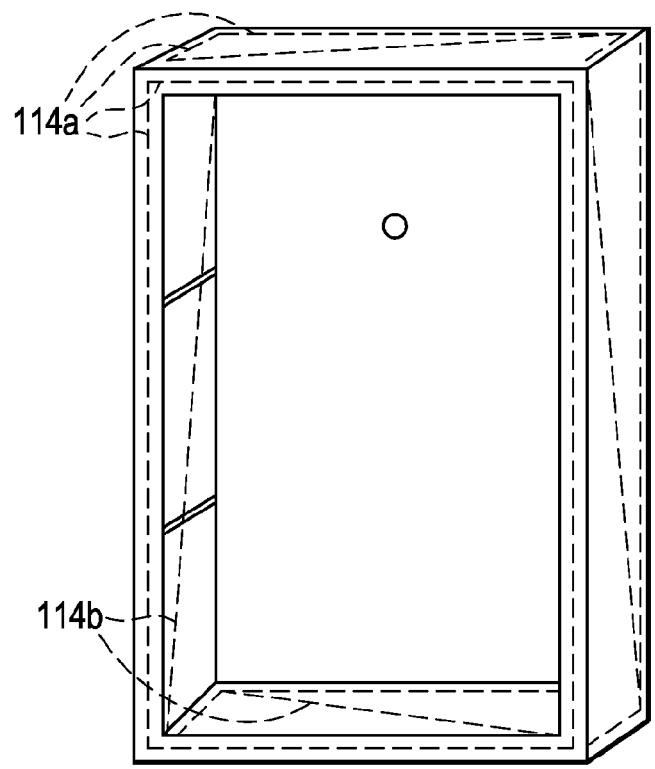
FIG. 3 illustrates reinforcement elements within a cooling cabinet, according to an embodiment of the invention.

Additionally, in an embodiment of the insulation unit 100 as shown in FIG. 3, reinforcement structures 114a and 114b are disposed within the volume defined between the inner liner 106 and the flexible skin 108. The reinforcement bars 114a may be placed in proximity to and in parallel to the edges of the insulation unit 100. Additionally, reinforcement bars 114b may be placed diagonally across the surfaces of the insulation unit 100. The reinforcement structures may be unattached at the ends or they may be fused together at the ends. The reinforcement bars 114a and 114b provide additional structure and support for the insulation unit 100 while also keeping the unit flush.

Although the reinforcement structures shown in FIG. 3 are disposed within the volume defined between the inner liner 106 and the flexible skin 108, the reinforcement structures may instead be mounted to the insulation unit 100 on an outer surface of non self-supporting flexible skin 108. Alternatively, the reinforcement structures may be mounted to the insulation unit on the inner surface of the inner liner 106. In yet another embodiment, the inner liner may be molded to define channels in which the reinforcement structures may be placed. The reinforcement bars may be located in the channels, well identified in the inner liners, in order to facilitate its extraction, at the end of the life of the unit, in order to have a more simple way of recycling.

Figure 4A:
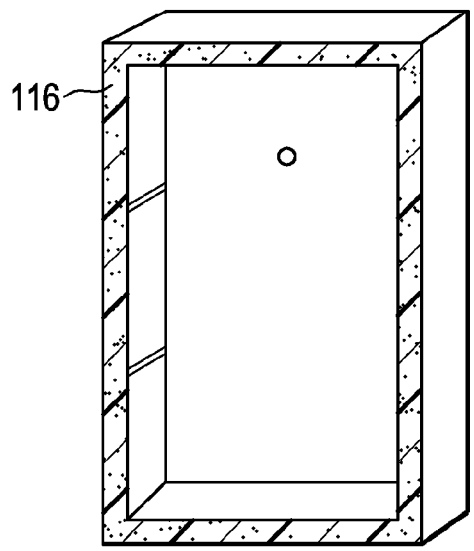
FIGS. 4A and 4B illustrate frames disposed on an insulation unit, according to embodiments of the invention.
Figure 4B:
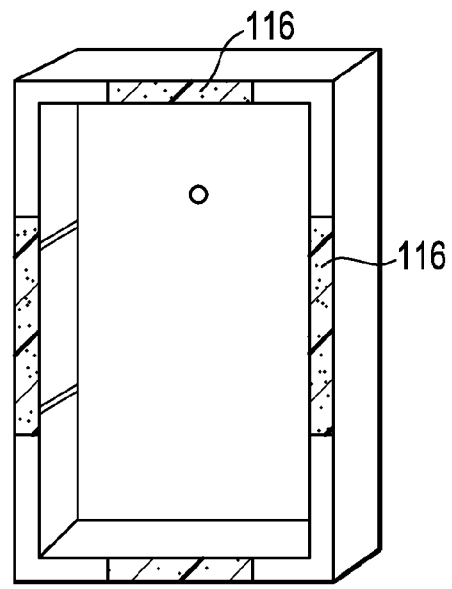

FIGS. 4A and 4B depict an embodiment of insulation unit 100 having a frame 116. The frame 116 may completely surround the front of cabinet 102 as in FIG. 4A, or alternatively, the frame 116 may partially surround the front of cabinet 102 as in FIG. 4B, Frame 116 may be adhered to the outer surface of the non self-supporting flexible skin 108. Alternatively, frame 116 may be hidden from plain view on the inside of the non self-supporting flexible skin 108, i.e. between the insulating foam 110 and the non self-supporting flexible skin 108. Either way, frame 116 may insure that a flat and regular surface is obtained in the area where the cabinet 102 and the door 104 touch to form a seal.

The insulation unit 100 may also include vacuum insulated panels disposed within the insulating foam 110. Vacuum insulation panels display high R-values in relatively thin panels and are commonly known in the art. The R-value describes the insulation properties of insulation materials in units of $K \cdot m^2/W$. The higher the R-value, the greater the insulation. The core of the vacuum insulated panel is an open-cell material that allows a vacuum to be pulled on the assembly. The open-cell material may be at least one of a polystyrene, a polyurethane, and a combination of silica, titania and carbon. The core is wrapped in a metallic or MYLAR foil, and the vacuum applied. The metallic film is sealed to maintain the vacuum for a long period of time.

Figure 5:
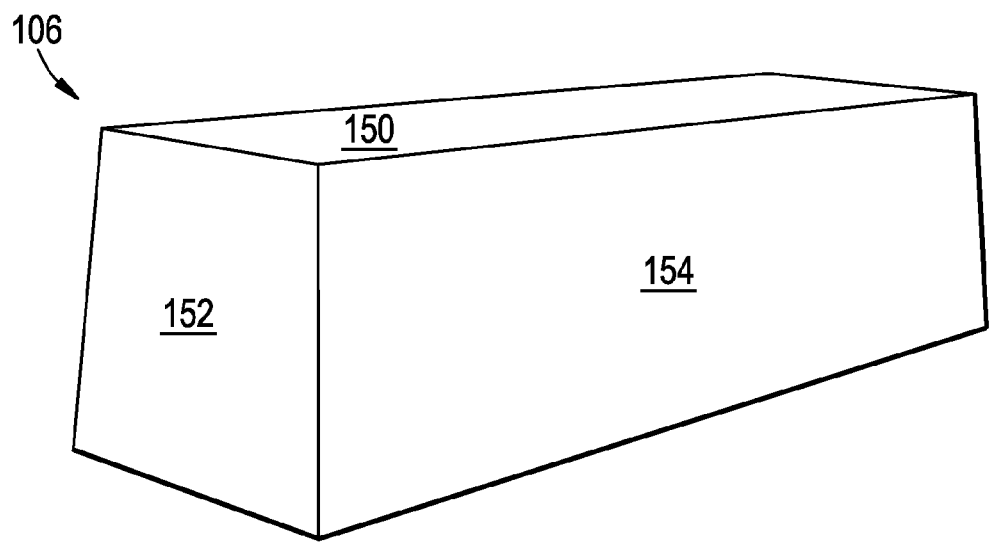
FIG. 5 illustrates an inner liner, according to an embodiment of the invention.

FIGS. 5-10 illustrate a process for making the insulation unit 100, according to an embodiment of the invention. In FIG. 5, the inner liner 106 is assembled. The view of the inner liner 106 in this figure is such that if the insulation unit 100 is a refrigerator, freezer, or cooler. A surface 150 is a backside of the insulation unit 100, a surface 152 is a top or bottom of the insulation unit 100, and a surface 154 is a side surface of the insulation unit 100.

The inner liner 106 may be made from any suitable material know in the art, such as aluminum, steel sheets, stainless steel, or vacuum or injection molded plastics. Suitable plastics include polystyrene, such as high-impact polystyrene (HIPS) or acrylonitrile-butadiene-styrene (ABS). Alternatively, the inner liner 106 may be multi layered including layers of HIPS coextruded with a styrenic alloy, or HIPS co-laminated with a polyethylene film. Such multilayered inner liners may be beneficial when the blowing agent used to produce the insulating foam 110 is aggressive with the liner material. For a lower cost insulation unit 100 the inner liner may be made from cut plastic sheets, such as HIPS or ABS, which are adhered together into the inner liner 106. Any method known in the art can be used to adhere the plastic sheets together, such as the use of an adhesive including glue, epoxy, or tape. The plastic sheets may also be welded, soldered, or sonicated in order to fasten the sheets. In one particular low cost embodiment, the plastic sheets are taped together using duct-tape.

Additionally, a multilayer protective film (not shown) may be placed over the inner liner 106, such as described in commonly assigned U.S. Pat. No. 6,164,739. The inner liner 106 and/or the multilayer protective film can be subjected to corona treatment to provide a surface to which the insulating foam can bond. The method of corona treatment of a non-polar thermoplastic film surface to create a polar surface which enhances adhesion is a well known practice. Preferably, the level of corona treatment is from about 35 dynes to about 65 dynes, and more preferably from about 38 dynes to about 65 dynes. This bonding of the inner liner 106 and/or the multilayer protective film to insulating foam aids in cabinet stability and reduces or eliminates the need for using adhesive polymers to promote good adhesion to the insulating foam.

Figure 6:
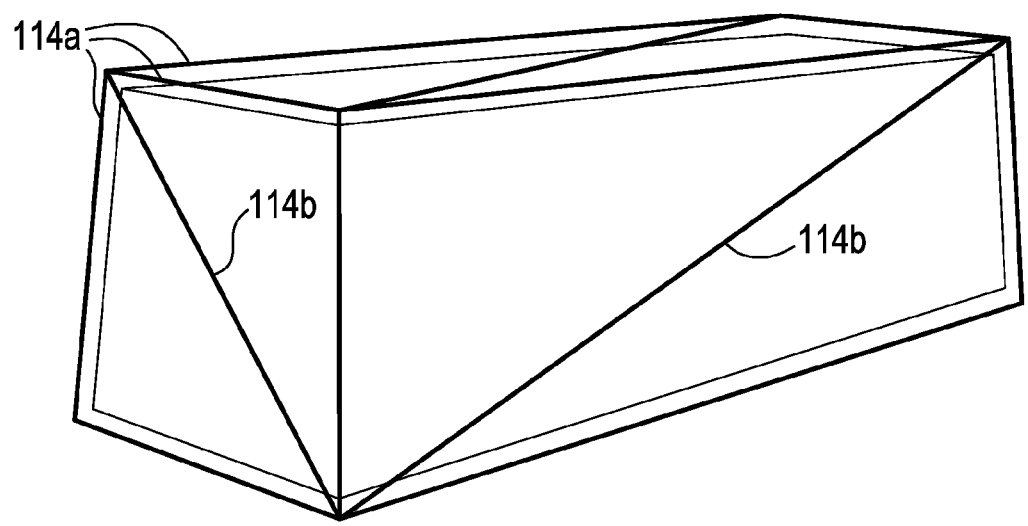
FIG. 6 illustrates an inner liner and reinforcement elements, according to an embodiment of the invention.

FIG. 6 illustrates the placement of the reinforcement structures 114a and 114b, according to an embodiment of the invention. The reinforcement structures 114a and 114b may be made from any suitable material know in the art, including iron, stainless steel, carbon steel, brass or other alloys, plastic, and composite materials. In one embodiment, the reinforcement bars are welded together into a frame and placed over the inner liner as shown in FIG. 6. The frame may be mounted to the inner liner 106 with tape. In one embodiment, the reinforcement structures are made from steel concrete reinforcement bars (rebar). In another embodiment the reinforcement structure may be a wire mesh, such as chicken wire, entirely or partially surrounding inner liner 106. The vacuum insulated panels may also be placed over the inner liner as well.

Figure 7:
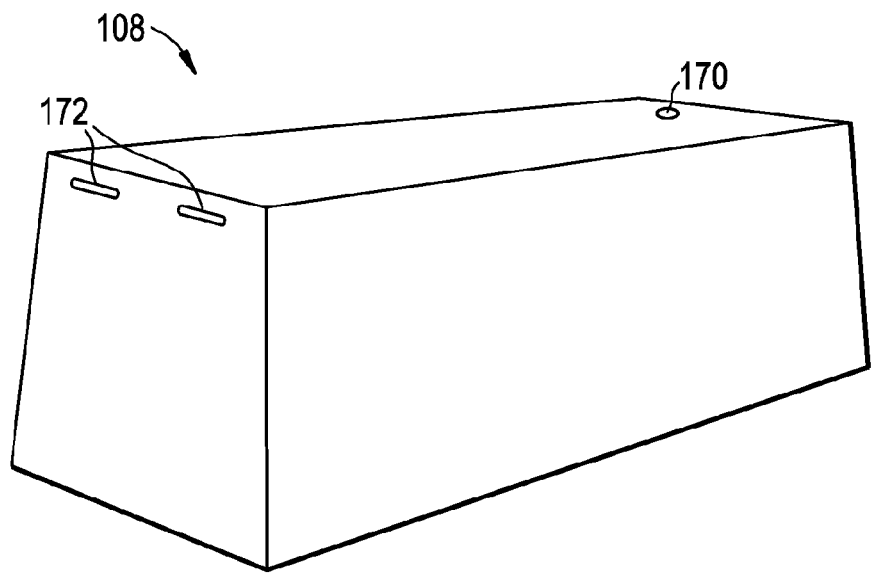
FIG. 7 illustrates non self-supporting flexible skin clad over the inner liner, according to an embodiment of the invention.

In FIG. 7, the non self-supporting flexible skin 108 is clad over the inner liner 106 and the reinforcement bars 114a and 114b. A hole 170 in the non self-supporting flexible skin 108 is provided for access for a nozzle to be used to inject the insulating foam into the volume defined between the inner liner 106 and the flexible skin 108. The hole 170 may be placed in an area that corresponds to one of the one or more access ports 112. Alternatively, a plurality of holes 170 may be found in the flexible skin 108 in order for multiple nozzles to be used for the injection of the insulating foam 110. Additionally, ventilation holes 172 may be made, if needed, in either the liner 106 or the non self-supporting flexible skin 108 in order to facilitate the escape of gas produced during the spraying of the insulating foam.

The non self-supporting flexible skin 108 may be made from any suitable material. The materials may be selected so that at least the surfaces of the non self-supporting flexible skin 108 which are in contact with the insulating foam 110 are compatible and do not chemically or physically degrade in the presence of the insulating foam 110 or any materials used in producing the insulating foam 110. The non self-supporting flexible skin 108 may be a single layer material or may be made of multiple layers.

In one embodiment, the non self-supporting flexible skin 108 may be combined with the reinforcement structure. For example, the non self-supporting flexible skin 108 may adhered or otherwise attached to a wire mesh, such as chicken wire.

Figure 8A:
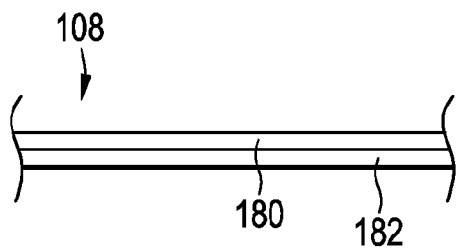
FIGS. 8A and 8B illustrate cross sections of non self-supporting flexible skins, according to embodiments of the invention.
Figure 8B:
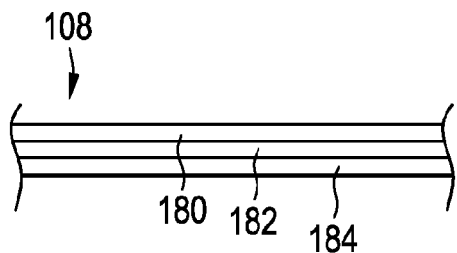

FIGS. 8A and 8B illustrate cross sections of embodiments of the non self-supporting flexible skin 108. In one embodiment flexible skin 108 is a double layer flexible skin (FIG. 8A), and in another a triple layer flexible skin (FIG. 8B). Alternatively, the non self-supporting flexible skin 108 may have one layer, or more than three layers. In both embodiments, the non self-supporting flexible skin 108 has a top layer 180 which forms the outside of insulation unit 100, and a barrier layer 182 which prevents leaking of insulating gases, such as $CO_2$, air, or physical blowing agent(s), from the insulating foam 110 (foam aging). In FIG. 8B, flexible skin 108 also includes a third layer 184. For example, the top layer 180 may be a polyethylene layer, a spray polyurethane layer, a TPO/TPU thermoformed flexible skin, or PVC rotomolded flexible skin. Other flexible materials, like textiles, based on natural or artificial fibers, or leather (natural and/or synthetic), may also be used. These skins may have external textures, like those seen in instrument panels for cars, or may have a fur-like appearance, as in for example faux leopard skin. Barrier layers are commonly known in the art, and suitable materials include polyethylene, styrenic alloys, MYLAR foil, and aluminum foil. The barrier layer 182 may be co-laminated, co-extruded, or other wise attached to the other layer(s) of the non self-supporting flexible skin 108.

The top layer 180 may itself be a multi layer or a laminate layer of, for example, thermoplastic polyolefin external skin, co-laminated with polyethylene foam, as commonly known in for example the automotive industry.

The non self-supporting flexible skin 108 may be stitched together from several cut sheets of multilayer material or formed as one sheet. In the sewn embodiment of non self-supporting flexible skin 108, the stitches provide small holes for the gas produced during the injection and subsequent foaming of the insulating foam to escape. Thus, in the stitched embodiments, ventilation the stitching holes may assist and/or replace holes 172 as a way for the gas to escape during the foaming process described below.

Figure 9:
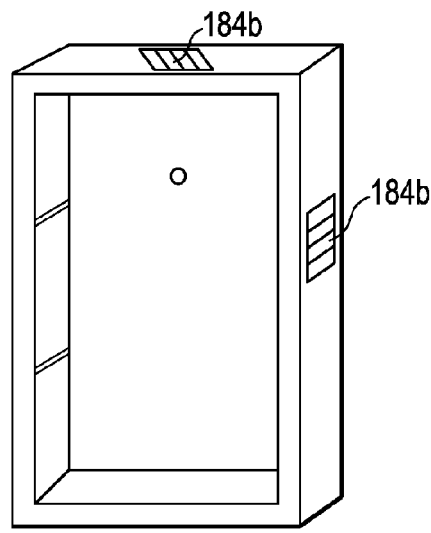
FIG. 9 illustrates a cooling cabinet, according to an embodiment of the invention.

The third layer 184 may be added to provide texture, a touch sensation, or an additional feel to the non self-supporting flexible skin 108. For example, if a soft touch is wanted, the third layer may be made from a soft polyurethane foam, such as a viscoelastic foam, a ethylene-vinyl acetate, or other materials that give a soft touch. On the other hand, if a firm touch is wanted, cardboard, particle board, wooden planks, HIPS sheets, ABS sheets, or other materials may be used as third layer 184. The third layer 184 may be placed at selected positions on non self-supporting flexible skin 108, as shown in FIG. 9, where the third layer 184 creates an embossed area 184b on the skin 108. This way selected areas have different a touch and look which may provide a visual effect and may be used to emboss the surfaces of the insulation unit 100 with company logos or trademarks. Alternatively, the third layer 184 may be situated between the top layer 180 the barrier layer 182.

The non self-supporting flexible skin 108 may be affixed to the inner lining 106 by a variety of means, such as through the use of adhesives, staples, stitches, zippers, fusion and the like. In a particular low cost embodiment, tape, such as duct tape, may be used to affix the flexible skin 108 to the inner lining 106.

Figure 10:
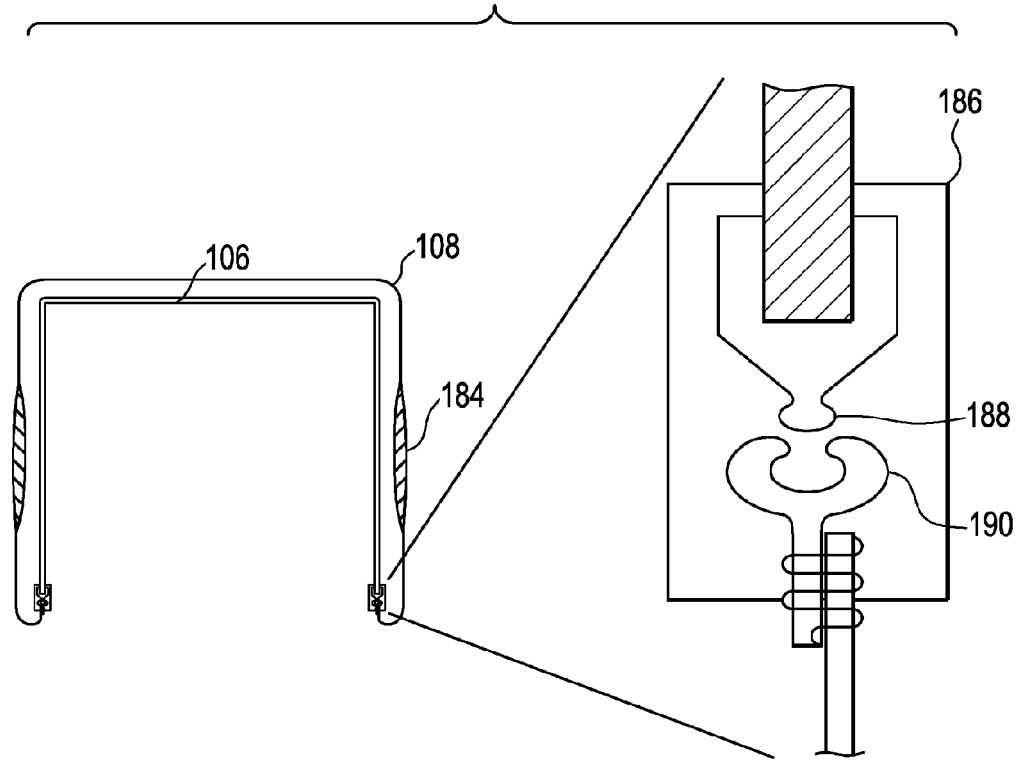
FIG. 10 illustrates a cross-section of a non self-supporting flexible skin attached to a cross-section of an inner liner, according to an embodiment of the invention.

FIG. 10 illustrates a method of affixing the flexible skin 108 to the inner lining 106, according to an embodiment of the invention. An attachment device 186 includes a ball 188 and socket 190 joint, and may be made from the same materials as the inner liner 106, The ball and socket joint may be made from any resistant plastics and may be sewed, glued, stapled, epoxyed, welded with heat or ultrasound, or otherwise affixed the inner lining 106 and the non self-supporting flexible skin 108. The parts of the ball and socket joint are shaped so that the socket 190 snaps or slides around the ball 188 to at least partially cover the ball 188 in order to hold the two parts together. Also in FIG. 10, it can be seen that the third layer 184 is selectively placed adjacent to portions of flexible skin 108. Alternatively, the third layer 184 may be placed at more or less places than pictured.

If a frame 116 is to be hidden from plain view on the inside of the flexible skin 108, i.e. between the insulating foam 110 and the non self-supporting flexible skin 108, the frame 116 may be inserted before the non self-supporting flexible skin 108 is affixed to the inner lining 106. The frame 116 may be made from any suitable material know in the art. Preferably, the frame is a magnetic metal, so that magnets may be placed in the door 104 in order to keep the insulating unit 100 closed and sealed.

An optional weight may, for example, be placed in the bottom side of the cabinet 102 or in the lower ends of the sides of the cabinet 102. Such an optional weight may add weight to the lower end of the cabinet 102 resulting in a lower center of mass in the cabinet 102. The optional weight may be any suitable material, such as metal, metal scrap, concrete slab, rocks, etc.

Figure 11:
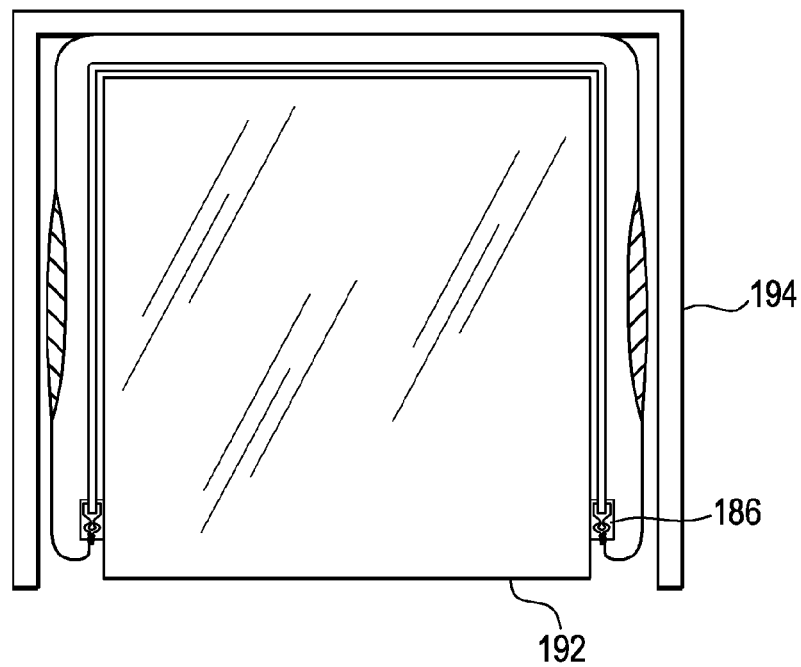
FIG. 11 illustrates a cross-sections of molds holding a cross-section of the non self-supporting flexible skin and the inner liner, according to an embodiment of the invention.
Figure 12:
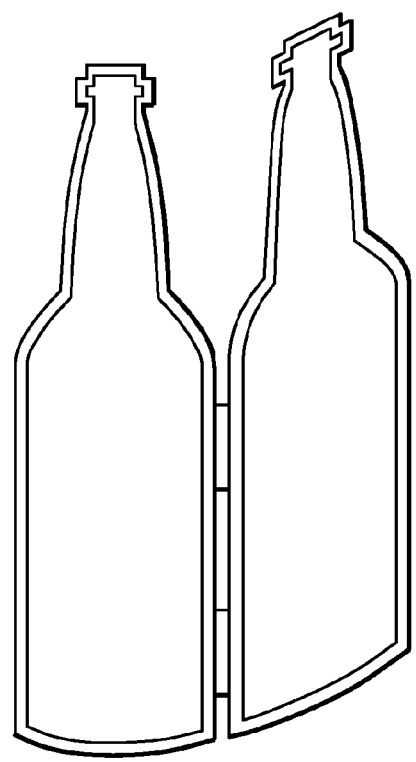
FIG. 12 illustrates a novelty shaped cooling cabinet, according to an embodiment of the invention.

After the non self-supporting flexible skin 108 is affixed to the inner liner 106, the assembly is placed on top of an inner mold, frame, or box 192 (FIG. 11). The box 192 provides structural support and prevents the inner liner 106 from deforming during the formation of the insulating foam 110. The box 192 may be made of any suitable material known in the art. In one embodiment the box 192 is a wooden box. The assembly is then transferred with the box 192 into an external mold 194. The mold 194 also provides support during the formation of the insulating foam 110 and ensures that the non self-supporting flexible skin 108 forms flat or other desirably shaped surfaces. Although both the box 192 the mold 194 of FIG. 11 are essentially square, any shape is contemplated, as is exemplified of the bottle shaped insulation unit 100 of FIG. 12. The mold 194 may also be a heated mold as is known in the art in order to provide heat, if needed, for the formation of the insulating foam 110.

After the assembly and box 192 is placed in the mold 194, a gas, such as compressed air, may be blown in through hole 170 in order to flatten out flexible skin 108 to prevent chinks folds, visual defects, aesthetics in the final product. Alternatively, a slight vacuum or suction on the outside of the non self-supporting flexible skin 108 may be applied in order to position the non self-supporting flexible skin 108 in a spaced apart distance from the liner. A foam forming formulation is then injected into the volume between the inner lining 106 and the non self-supporting flexible skin 108, and the insulating foam 110 is formed as is known in the art.

The insulating foam 110 may be made from any suitable material know in the art. In embodiments of the invention, the suitable material may be compatible with the inner liner and outer liner. The foam forming formulation may be chosen so that the resulting foam is a simi-rigid, rigid, or viscoelastic foam. In embodiments of the invention the rigid insulating foam is made from a closed-celled, or open-celled, cellular polyurethane, polyisocyanurate, or polystyrene. In one embodiment the rigid insulating foam 110 is a polyurethane foam. Such polyurethane materials have a high thermal resistance, and a high compressive strength sufficient to contribute to the benefit of overall structural strength of the wall. The polyurethane polymer can be prepared by mixing intimately under suitable reaction conditions an organic polyisocyanate with a polyol, in the presence of an expanding agent, and introducing the foam-forming mixture into the space between the inner liner 106 and the non self-supporting flexible skin 108. Advantageously the expanding agent is employed in quantities sufficient to provide for a foam advantageously having an overall bulk density of from 10 to 200 kg/m$^3$, preferably 15 to 100 kg/m$^3$. In one embodiment, and the overall bulk density is about 60 kg/m$^3$ or less.

Carbon dioxide, liquefied or gaseous, may be introduced, when reacting the organic polyisocyanate with polyol, either when mixing the reactants or alternatively by prior mixing with one or more of the reactant streams. Alternatively, the carbon dioxide may be generated in situ while preparing the polyurethane. Carbon dioxide can be generated in situ by the chemical reaction of polyisocyanate with water, as may be present when preparing the polyurethane. Carbon dioxide can also be generated in situ by the thermal decomposition of a substance known to give carbon dioxide. The exotherm of the polyurethane formation reaction being sufficient to thermally decompose such substances including, for example, ammonium carbonate and the amine/carbon dioxide complexes such as described in U.S. Pat. Nos. 4,500,656 and 4,735,970. It is preferred to use carbon dioxide generated by an in situ procedure and especially by the polyisocyanate/water reaction. For this purpose, water is present in an amount of from 0 to 10, preferably from 0.1 to 8, and more preferably from 0.5 to 5 parts by weight per 100 parts by weight of polyol.

When the expanding agent also contains a physical blowing agent, such agents are generally organic compounds having an atmospheric boiling point of between about −50° C. and about 100° C. at 760 mm/Hg. Suitable physical blowing agents include aliphatic or cycloaliphatic $C_3$ to $C_8$ alkanes, hydro chlorofluorocarbons (HCFC's), polyfluorinated alkanes (HFC's) including perfluorinated alkanes, or polyfluorinated ethers including perfluorinatedethers. Exemplary and preferred are aliphatic or cycloaliphatic alkanes including pentane, hexane, (methyl)cyclopentane, or cyclohexane or mixtures of two or more such blowing agents.

The polyols which are useful in the preparation of the polyurethane foam include those materials having two or more groups which contain an active hydrogen atoms which can react with an isocyanate, such as are described in U.S. Pat. No. 4,394,491. Preferred among such polyol compounds are those having at least two hydroxyl, primary or secondary amine, carboxylic acid, or thiol groups per molecule. Polyols, that is, compounds having at least two hydroxyl groups per molecule, may be preferred due to their desirable reactivity with polyisocyanates.

Suitable polyols for preparing rigid polyurethanes include polyether polyols, polyester polyols, polyhydroxyl-terminated acetal resins, hydroxyl-terminated amines and polyamines having an equivalent weight of 50 to 700, preferably 70 to 300 and more preferably 100-200. Such isocyanate-reactive materials also advantageously have a functionality of at least 2, preferably 3, up to 16, preferably up to 8. Examples of these and other suitable isocyanate-reactive materials are described more fully in U.S. Pat. No. 4,394,491, particularly in columns 3-5 thereof. Most preferred for preparing rigid foams, on the basis of performance, availability and cost is a polyether or polyester polyol having from 2 to 8, preferably 3 to 8 active hydrogen atoms per molecule. Exemplary of such polyether polyols include those commercially available under the trademark VORANOL such as VORANOL 202, VORANOL 360, VORANOL 370, VORANOL 446, VORANOL 490, VORANOL 575, and VORANOL 800 all sold by The Dow Chemical Company.

Typically, polyols suitable for preparing rigid polyurethanes include those having an average molecular weight of 100 to 10,000 and preferably 200 to 7,000. Such polyols also advantageously have a functionality of at least 2, preferably 3, and up to 8 active hydrogen atoms per molecule. For the production of semi-rigid foams, it is preferred to use a trifunctional polyol with a hydroxyl number of 30 to 300. Representative of polyols include polyether polyols, polyester polyols, Mannich polyols, polyhydroxy-terminated acetal resins, hydroxyl-terminated amines and polyamines. The polyols may be selected based on their flame retardant properties.

In one embodiment, the polyol is a mixture of polyether or polyester polyols used to prepare "flexible" foams and polyols used to prepare "rigid" foams. The flexible polyols generally have a hydroxyl number of 25 to 75 and a functionality of 2 to 3. The polyols used for rigid foams generally have a hydroxyl number of 150 to 800 and a functionality of 2 to 8. When such a blend is used, the blend has an average molecular weight and average functionality as described above.

For viscoelastic foams, shorter chain polyols with hydroxyl numbers above 150 may be used.

Polyisocyanates which are suitable for use in the practice of the present invention in making polyurethanes include aromatic, aliphatic and cycloaliphatic polyisocyanates and combinations thereof. Representative of these types are diisocyanates such as m- or p-diphenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5',5'-tetraisocyanate and the diverse polymethylene polyphenylpolyisocyanates. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. Especially preferred are methylene-bridged polyphenylpolyisocyanates, due to their ability to crosslink the polyurethane.

In addition to the foregoing components, it may be desirable to employ certain other ingredients in preparing cellular polyurethane. Such additional ingredients include catalyst, surfactant, flame retardant, preservative, colorant, antioxidants, reinforcing agent, and fillers. When desiring to prepare an open-celled foam advantageously a cell opening agent may be present. Such cell opening agents and techniques for preparing an open celled foam are described in the open literature and various patent publications including, for example, U.S. Pat. Nos. 5,284,882; 5,350,777; 5,318,997; 5,248,704; and 3,694,385; G.B. 1102,391; G.B. 1,065,590; EP-622,388-A; EP-610,734-A; EP-547,515-A; and EP-A-188,806.

When preparing the polyurethane foam, it may be preferable to employ a minor amount of a surfactant to stabilize the foaming reaction mixture until it cures. Such surfactants include a liquid or solid organosilicone surfactant. Other surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 5 parts of the surfactant per 100 parts by total weight active hydrogen-containing compound(s) present are generally sufficient for this purpose One or more catalysts for the reaction of the active hydrogen-containing compound(s) with the polyisocyanate are advantageously used. Any suitable urethane catalyst may be used, including tertiary amine compounds and organometallic compounds. Exemplary tertiary amine compounds include triethylenediamine, N-methyl morpholine, pentamethyldiethylenetriamine, tetra methylethylenediamine, 1-methyl-4-dimethylaminoethyl piperazine, 3-methoxy-N-diethylpropylamine, N-ethyl morpholine, diethylethanolamine, N-coco morpholine, N,N-dimethyl-N',N'-dimethyl isopropylpropylenediamine, N,N-diethyl-3-diethylaminopropylamine, dimethylbenzylamine, or N,N-dimethyl cyclohexylamine. Exemplary organometallic catalysts include organomercury, organolead, organoferric and organotin catalysts, with organotin catalysts being preferred among these. Suitable tin catalysts include stannous chloride; tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are 0.001 to 4 parts of catalyst per 100 parts by total weight of polyol(s) present.

In making a polyurethane foam, the polyol(s), polyisocyanate and other components, including water, are contacted, thoroughly mixed and permitted to react and to expand and cure into a cellular polymer. The isocyanate index (ratio of equivalents of isocyanate to equivalents of active hydrogen-containing groups, including water as may be present) may be from 0.9 to 5.0, preferably 0.9 to 3.0, more preferably 1.0 to 1.5. The particular mixing apparatus is not critical, and various types of mixing head and injection apparatus are conveniently used. It is often convenient, but not necessary, to preblend certain of the raw materials prior to reacting the polyisocyanate and active hydrogen-containing components. For example, it is often useful to blend the polyol(s), water, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to prereact all or a portion of the active hydrogen-containing compound(s) with the polyisocyanate to form a prepolymer.

Upon the formation of the cabinet 102, electrical and cooling hardware may be installed. Such hardware is commonly known in the art, and includes lighting, compressors, cooling coils, air blowers, etc. Much of the hardware may be placed on the back of the cabinet 102. FIG. 13 illustrates a side view of the cabinet 102 wherein a bottom back part has a contoured shape 198 in order to allow for placement of the electrical and cooling hardware. Hardware connections may enter the interior of the cabinet 102 through access port 112. Access port 112 may be drilled through the inner liner 106, the rigid insulating foam 110, and through the hole 170 of the skin 108. Alternatively, the inner liner may have the access port 112 predrilled before assembly, in which case the access port 112 must be covered before the injection of the rigid insulating foam 110.

The door 104 may be made by the same process as described above. The door 104 may have the same inner liner 106 as the cabinet 102, and may have the same flexible skin 108. Alternatively different materials may be used for the cabinet 102 and the door 104 for alternate designs.

The methods described herein allow for a novel ways of making cooling cabinets, which depend less on large machinery needed to shape metal plates into the outer and/or inner liners of the cooling cabinets. Such machinery generally requires a large start up cost for the production of refrigerators and freezers. Thus, by eliminating the need for this heavy machinery, the facilitation of manufacturing sites for refrigerators and freezers is less taxed and can more easily be performed where labor costs are low.

Additionally, the methods described herein negate the need for painting the cooling cabinets as the design and color of the unit may be determined by the design and color(s) of the flexible skin.

Furthermore, the methods described herein allow for a nearly 100% recyclable insulation unit. Upon the expiration of the insulation unit, the hardware can be removed from the unit, and between about 9 and about 15 cuts can be made at strategic places to easily separate the reinforcement structures from the rigid insulating foam and the non self-supporting flexible skin layer. The unit may have attached a manual for recycling showing where and how to cut, in order to extract all the recyclable parts. Once the metal parts are removed, the rest of the unit may be cut into pieces, which may be utilized as, for example, filling for construction bricks to provide additional thermal insulation for buildings. Other uses for the recycled materials are also contemplated.

Although the above embodiments have been in relation to insulating units, the above embodied methods may be used to produce other articles of manufacture. For example, the embodied methods may be used to produce furniture, other household appliances, kitchen cabinetry, doors, etc. In one embodiment, the embodied methods may be used to make head and footboards for beds. In one embodiment, the embodied methods may be used for the rigid parts of seats, couches, futons, and the like. In one embodiment, the above embodied methods may be used to produce, for example, a coordinated kitchen wherein the exterior of the insulating unit 100 is coordinated with the exterior doors of the kitchen cabinets, dishwashers, and so forth.

EXAMPLES

Example 1

The inner liner is made from sheets of HIPS held together using duct tape. The inner liner have a height of 135 cm, a width of 45 cm, and a depth of 35 cm. The reinforcement structures are steel reinforcement ⅜" steel bars typically used for concrete reinforcement in civil construction. The reinforcement bars are welded together at the ends to form a frame which is taped to the inner liner. The non self-supporting flexible skin layer of this example consists of an ordinary polyethylene typically used for truck charge covers. The polyethylene is sewn into a bag which is clad around and taped to the inner liner using duct tape. A vent hole is also cut into the bag and reinforced with duct tape. A homemade, low cost, wooden mold is used. The mold consists of a wood surface in the jig, and non heated steel surrounding the wood surface.

A Cannon A-200 injection machine is used to inject the foam forming formulation. The polyol used is VORANOL 360 (a sucrose-based polyether polyol available from The Dow Chemical Corporation) with silicone surfactant, water, and aminic catalyst as additives. The physical blowing agent is HFC-134a (available from Du Pont), and the isocyanate is PAPI 27, (polymethylene diphenyl diisocyanate, available from The Dow Chemical Company). VORANOL, and PAPI are trademarks of The Dow Chemical Company. The polyol and isocyanate temperature is 71° F. (21.7° C.), the polyol/isocyanate specific gravity is 1.094/1.24, and the polyol and isocyanate injection pressure is 1200 psi (8,274 kPa). The foam forming formulation has a gel time of 37 seconds, a tack free time of 43 seconds, and a free rise density of 24 kg/m³. The resulting cabinet is a rigid and solid cabinet suitable for use as a refrigeration or freezer unit.

Example 2

The same methodology of Example 1 is performed, but additionally a viscoelastic foam piece measuring 30 cm by 30 cm by 0.5 cm is taped to the inside of the polyethylene bag, resulting in an embossed section of the back of the cabinet corresponding to the viscoelastic foam. This embossed section has a soft touch.

Example 3

The same methodology of Example 1 is performed, but additionally a conventional slab stock flexible foam piece measuring 30 cm by 30 cm by 0.5 cm is taped to the inside of the polyethylene bag, resulting in an embossed section of the back of the cabinet corresponding to the conventional slab stock flexible foam. This embossed section has a soft touch.

While the foregoing is directed to embodiments of the present invention, other and further embodiments of the invention may be devised without departing from the basic scope thereof, and the scope thereof is determined by the claims that follow.

The invention claimed is:

1. An insulation unit, comprising:
   an inner lining comprising an inner face and an outer face, wherein the inner face is disposed to define a cavity of the insulation unit;
   an insulating foam disposed on the outer face of the inner lining, wherein the insulating foam comprises an inner face and an outer face, and the inner face of the insulating foam is adhered to the outer face of the inner lining; and
   an outer lining disposed on the outer face of the insulating foam, wherein the outer lining comprises a non self-supporting flexible skin which is adapted to define at least parts of an outer surface of the insulation unit and is adhered to the outer face of the insulating foam; and
   a plurality of reinforcement structures arranged in a manner selected from at least one of parallel to an edge of the insulation unit and diagonally across a vertical or horizontal side of the insulation unit,
   wherein the inner lining and the outer lining are connected by at least a ball and socket joint.

2. The insulation unit of claim 1, wherein the insulating foam is a rigid foam.

3. The insulation unit of claim 1, wherein the reinforcement structures are disposed in proximity to at least one of the inner face of the inner lining, the outer face of the inner lining, and the outer surface of the insulation unit.

4. The insulation unit of claim 3, wherein the reinforcement structures comprises reinforcement bars arranged to form a frame disposed within the rigid insulating foam.

5. The insulation unit of claim 1, wherein the non self-supporting flexible skin comprises at least one layer of at least one flexible polymers, natural fibers, or artificial fibers.

6. The insulation unit of claim 5, wherein the non self-supporting flexible skin comprises a layer selected from at least one of a spray polyurethane layer, thermoplastic polyolefin layer, thermoplastic polyurethane, polyvinyl chloride rotomolded layer.

7. The insulation unit of claim 6, wherein the non self-supporting flexible skin further comprises a gas barrier layer.

8. The insulation unit of claim 7, wherein the gas barrier layer comprises at least one of polyethylene, styrenic alloys, and aluminum.

9. The insulation unit of claim 1, further comprises a layer disposed between the outer face of the rigid insulating foam and the flexible skin.

10. A method for assembling a insulating unit, comprising:
    providing an inner lining comprising an inner face and an outer face, wherein the inner face is disposed to define a cavity of the insulating unit;
    providing an outer lining disposed around the outer face of the of the inner lining in a space apart arrangement, wherein the outer lining comprises a non self-supporting flexible skin which is adapted to define at least parts of an outer surface of the insulating unit, and wherein there is a space defining a volume between the outer face of the inner lining and the outer lining;
    securing the inner lining and non self-supporting flexible skin together using a ball and socket joint;

placing reinforcement structures in a manner selected from at least one in proximity to and parallel to an edge of the insulating unit and diagonally across the surfaces of the unit, the reinforcement structures disposed in proximity to at least one of the inner face of the inner lining, the outer face of the inner lining, and the outer surface of the insulation unit; and injecting a foam forming formulation into the volume between the outer face of the inner lining and the outer lining, wherein the foam forming formulation is allowed to foam and cure into an insulating foam.

11. The method of claim 10, wherein the insulating foam is a rigid foam.

12. The method of claim 10, wherein the reinforcement structures comprises reinforcement bars arranged to form a frame disposed within the rigid insulting foam.

13. The method of claim 10, wherein the non self-supporting flexible skin comprises at least one layer of at least one of flexible polymers, natural fibers, or artificial fibers.

14. The method of claim 13, wherein the non self-supporting flexible skin comprises a layer selected from at least one of a spray polyurethane layer, thermoplastic polyolefin layer, thermoplastic polyurethane, polyvinyl chloride rotomolded layer.

15. The method of claim 14, wherein the non self-supporting flexible skin further comprises a gas barrier layer.

16. The insulation unit of claim 1 as an appliance device.

17. The insulation unit of claim 16 in which the appliance device is one of a refrigerator, a freezer, a cooler, a dish washer, and a water heater.

18. An article of manufacture, comprising:

an inner lining comprising an inner face and an outer face, wherein the inner face is disposed to define a cavity of the insulation unit;

foam disposed on the outer face of the inner lining, wherein the foam comprises an inner face and an outer face, and the inner face of the foam is adhered to the outer face of the inner lining; and an outer lining disposed on the outer face of the foam, wherein the outer lining comprises a non self-supporting flexible skin which is adapted to define at least parts of an outer surface of an insulation unit and is adhered to the outer face of the foam; and a plurality of reinforcement structures arranged in a manner selected from at least one of parallel to an edge of the insulation unit and diagonally across a vertical or horizontal side of the insulation unit, wherein the inner lining and the outer lining are connected by at least a ball and socket joint.

19. The article of manufacture of claim 18, wherein the article of manufacture is at least one of a headboard, a footboard, a seat, a couch, a futon, a door, a pantry, and a cupboard.

* * * * *